Patented Feb. 16, 1943

2,311,310

UNITED STATES PATENT OFFICE 2,311,310

MANUFACTURE OF TIN NAPHTHENATE

Donald E. Bowers, Los Angeles, Calif., assignor to Socony-Vacuum Oil Company, Incorporated, New York, N. Y., a corporation of New York No Drawing. Application March 11, 1941, Serial No. 382,839

2 Claims. (Cl. 260—429)

It is customary to manufacture the tin salts of the naphthenic acids by reaction between mixed sodium naphthenates and stannous chloride. I have improved on this process in the control of the alkalinity of the reacting mass, by which the yield is improved and the percentage of tin in the product is materially increased.

By way of example, purified naphthenic acids of molecular weight 180 to 210 are first converted to sodium naphthenate by the addition, without heating of a solution of sodium hydroxide. The pH value of the aqueous solution thus produced should be about 10 to 10.5.

A layer of light petroleum distillate is then floated on the aqueous solution. Technical stannous chloride, in quantity about 10% in excess of the calculated combining weight, is ground to about 100 mesh and is slowly added to the liquids, with continuous agitation to intermingle the phases. As the solid salt is added, the pH of the solution falls until a pH value of about 8 is reached. From this point alternate additions of a strong (e. g. 49%) solution of sodium hydroxide are made, so proportioned as to maintain the pH value of the solution between 7.5 and 8.2, until all of the tin salt has been introduced.

Agitation is then discontinued and the petroleum distillate, containing the tin naphthenate in solution, is allowed to rise to the surface and is decanted. A diatomaceous earth filter-aid is mixed with the naphthenate solution, which is then filtered at about 150° Fahr. The resulting product is a clear yellow solution which, on boiling off the petroleum distillate, yields a very viscous tacky product containing about 20% by weight of tin.

This high percentage of tin in the product is attained through the control of the pH value within the range above specified. My experiments have shown that if the pH falls materially below 7.5 during the reaction, as it will if the addition of alkali to the reacting mass be omitted, the percentage of tin in the product will be much lower, ordinarily from 12% to 15%, and that the tin naphthenate is apt to decompose upon heating. On the other hand, if the pH is allowed to go materially above 8.2, as by excessive additions of alkali, the percentage of tin in the product is satisfactory but the yield as compared with the theoretical will be very small.

To make the so-called "basic" tin naphthenate the same procedure is followed up to the point at which about four fifths of the calculated quantity of tin chloride has been added. At this point aqueous sodium hydroxide is added to bring the pH of the mass up to about 11.0 and this degree of alkalinity is maintained while the remainder of the tin salt is being introduced. After the above described steps of filtering the tin naphthenate solution with a filter-aid and evaporating off the petroleum distillate, the product has a chalky appearance and contains upwards of 27% of tin.

Any of the alkali metal hydroxides may be substituted for sodium hydroxide in the above descriptions, but without any advantage to offset the increased cost.

I claim as my invention:

1. The method of making tin naphthenates which comprises: gradually adding to an aqueous solution of an alkali metal naphthenate about four-fifths of the calculated quantity of stannous chloride; maintaining the pH value of said solution during said addition substantially within the limits pH 7.5 to pH 8.2; then increasing the pH value of said solution to about pH 11.0 by addition thereto of an alkali metal hydroxide; adding the remainder of the calculated quantity of stannous chloride while maintaining the pH value of said solution at about 11.0, and collecting the precipitated tin naphthenate.

2. The method of making tin naphthenates which comprises: reacting an alkali metal naphthenate in aqueous solution with stannous chloride in the presence of a solvent for tin naphthenate; maintaining the pH value of said aqueous solution substantially within the limits pH 7.5 to pH 8.2 during said reaction; agitating the mass to bring the precipitated tin naphthenate into solution in said solvent; separating the petroleum distillate solution from the aqueous solution; filtering the petroleum distillate solution and evaporating the petroleum distillate therefrom to recover the dissolved tin naphthenate.

DONALD E. BOWERS.